US007310567B2

(12) United States Patent
Zetek et al.

(10) Patent No.: US 7,310,567 B2
(45) Date of Patent: Dec. 18, 2007

(54) METHOD FOR THE PREPARATION, TREATMENT AND UPDATING TOOL DATA

(75) Inventors: Berndt Zetek, Lohr am Main (DE); Andreas Guenzelmann, Kreuzwertheim (DE)

(73) Assignee: Rexroth Indramat GmbH, Lohr am Main (DE)

( * ) Notice: Subject to any disclaimer, the term of this patent is extended or adjusted under 35 U.S.C. 154(b) by 319 days.

(21) Appl. No.: 10/489,275

(22) PCT Filed: Sep. 12, 2002

(86) PCT No.: PCT/DE02/03462

§ 371 (c)(1),
(2), (4) Date: Aug. 6, 2004

(87) PCT Pub. No.: WO03/023545

PCT Pub. Date: Mar. 20, 2003

(65) Prior Publication Data

US 2005/0055323 A1    Mar. 10, 2005

(30) Foreign Application Priority Data

Sep. 12, 2001    (DE) ................................ 101 44 977

(51) Int. Cl.
*G06F 19/00*    (2006.01)
(52) U.S. Cl. ...................... 700/175; 700/169; 700/179; 700/173
(58) Field of Classification Search ................ 700/169, 700/176, 179, 173, 175
See application file for complete search history.

(56) References Cited

U.S. PATENT DOCUMENTS

| 4,550,375 A | * | 10/1985 | Sato et al. .................. 700/169 |
| 5,244,447 A | * | 9/1993 | Tanaka et al. .............. 700/169 |
| 5,933,353 A | * | 8/1999 | Abriam et al. ............. 700/182 |
| 6,759,620 B2 | * | 7/2004 | Marchesi et al. ........ 219/69.13 |

FOREIGN PATENT DOCUMENTS

| DE | 0 699 514 A | 3/1996 |
| DE | 197 24 926 A | 12/1997 |
| DE | 198 07 343 A | 9/1998 |
| DE | 198 56 116 A | 6/2000 |
| EP | 0 618 026 A | 10/1994 |
| EP | 1 018 676 A | 7/2000 |
| JP | 6-43920 | * 2/1994 |

\* cited by examiner

*Primary Examiner*—Leo Picard
*Assistant Examiner*—Steven R. Garland
(74) *Attorney, Agent, or Firm*—Michael J. Striker

(57) ABSTRACT

A method for the preparation, editing and maintenance of tool data sets for machining processes in an NC control system has at least one tool data organization that is separate from the control and is stored in the memory of an ADP system. The tool data organization has tool data sets for tools that for each of the tools to be used has the space for static and dynamic data. The tool data organization has separate list data sets of a machining process that can each contain a reference to the associated tool data set, and the required list data sets are taken over and stored in memory, together with the associated tool data sets, for process execution in the NC data processing unit. At least the dynamic data of the tool data sets can be updated in accordance with the current NC machining processes.

27 Claims, 3 Drawing Sheets

METHOD FOR THE PREPARATION, TREATMENT AND UPDATING TOOL DATA

CROSS-REFERENCE

The invention described and claimed hereinbelow is also described in PCT/DE 02/03462, filed on Sep. 12, 2002 and DE 101 44 977.1 filed on Sep. 12, 2001. This German Patent Application provides the basis for a claim of priority of invention under 35 U.S.C. 119(a)-(d).

BACKGROUND OF THE INVENTION

The invention relates to a method for the preparation, editing and maintenance of tool data sets for machining processes in an NC (Numerical Control) control system, with at least one tool data organization that is separate from the control system.

Because of the local data organization in the CNC (Computer Numerical Control, among other factors, until now dynamic tool data, such as wear values, have been manually reserviced and initially serviced by the machine operator before the system is in a consistent state with regard to the tool data.

SUMMARY OF THE INVENTION

The object of the present invention is to furnish a method for the preparation, editing and maintenance of tool data sets that is universally usable and that makes variable, automatic servicing of the tool data sets possible.

This object is attained by a method for the preparation, editing and maintenance of tool data sets for machining processes in an NC control system, having at least one tool data organization that is separate with respect to the control and is stored in the memory of an ADP (Automatic Data Processing) system, wherein the tool data organization has tool data sets for tools that for each of the tools to be used each have the space for static and dynamic data, that is, data that are subjected to changes in the NC machining process, and wherein the tool data organization has separate list data sets of a machining process that can each contain a reference to the associated tool data set, and the required list data sets are taken over and stored in memory, together with the associated tool data sets, for process execution in the NC data processing unit, and wherein at least the dynamic data of the tool data sets can be updated in accordance with the current NC machining processes.

The values are serviced automatically in accordance with the current machining processes. Not only is a single set of tools and tool lists known, but also, because of the processing in the data processing system, it is possible to obtain a correlation with other data sets, in particular the tool data and the tool list data, as well as the usage-specific and machine-specific data. Thus the data sets need not be organized repeatedly and inconsistently but instead can be organized in adapted form. Data sets with different values and tool properties are avoided, which in particular prevents the tool data from failing to match the properties of the actual tool and/or the environment in which the tool is to be used. The invention shortens machine tool setup times and supports work preparation. User support is provided in the tool administrator. In particular, the invention is used separately in numerical control systems with central or decentralized administration of tool data, offline data and/or online data which function with a tool management system or themselves contain a tool management system.

If static data of the tool data sets can also be updated as well in accordance with the current NC machining processes, then a very user-friendly screen is available which can be reconfigured as needed for a given use. Thus static and dynamic tool data can be administered. If the data set of a tool is varied during workpiece machining on an NC machine—as a rule, dynamic tool data are varied automatically, while static tool data can be varied—then these should as much as possible be available in updated form for all further uses of the tool.

The safety, security and reliability of the method are enhanced if automatic detection of defective or inconsistent tool lists is effected.

Repeated inputting of tool data is avoided if an automatic repair of defective or inconsistent tool lists is effected.

Fast, secure connection to new environments and systems is possible if an automatic tool detection of newly generated tools defined in the CNC control system is effected.

It is advantageous if, in an external application or from the memory-programmed control system without involvement of the tool administrator, a tool data set can be set up from existing tools in accordance with the fundamental machining processes and then imported into the tool administrator. Because of the uniform form of the data sets, it is assured that the data sets thus generated can also be detected appropriately by the tool administrator and correctly grouped into categories.

Simple, reliable manipulation is possible if the tool administrator detects the newly set-up tools and groups them and administers them in accordance with their properties.

Given adequate detection, that is, a match with a predetermined data set structure and a complete tool specification, a complete grouping into categories is effected.

Correct detection of the external tool data set and grouping into categories are thus effected if adequate compatibility and in particular an identical data set structure of the tool data sets of the external application exists, and if the tool specifications are complete.

It is advantageous if in the event of incomplete or defective tool data sets, a grouping as an incomplete data set is effected. The incomplete or defective tool data sets are grouped into categories and/or classified as an unknown tool. The associated data are accordingly not lost and are undamaged, so they do not cause a crash or in other words a data loss.

Rational utilization of memory space and greater simplicity are achieved if lists with references to tools that are not present or are no longer present, that is, tools that have been deleted from the tool administrator, are delivered to a separate list administrator.

It is advantageous if space data from the tool list administrator and tool data from the tool administrator are downloaded, combined, into the control system. Then the data matching and/or adapted to one another are available simultaneously and can be evaluated in correlated form.

A situation that is always adapted to the actual data situation at a given moment exists if before the downloading, at least some of the data sets are updated in advance in the tool administrator by means of an inherent upload function of the tool data used.

Masters with user data, that is, specific tool data, are set up for setting up and configuring tools and tool lists.

Multi-client capability is achieved if a plurality of NC control systems and a local/decentralized tool data organization are employed. In this way, an arbitrary number of users can all work with the tool administrator simultaneously.

Flexible utilization is possible if subsets of the total supply of tools and/or tool data are administered separately.

It is advantageous if differential lists and/or partial lists are formed and handled. These differential lists are automatically formed from the actual status of the tool memory and the desired list specified by the programming system and are optimized in accordance with specifications of the user; optimizing criteria are for instance tool changing times or conversion times.

Fast adaptation to various users with little complication is possible if user-specific data, in particular space data, and tool-dependent tool data are administered separately. Thus the tool data can be updated without lists having to be changed.

Central administration is possible if the total supply of tools and/or tool data of one or more machines can be administered by means of one management system. The machines, ADP systems, especially industrial PCs, are centrally administered by a management system, in particular in the form of an especially equipped ADP system.

It is advantageous if a plurality of tool data organizations and a higher-ranking management system are administered centrally in a further data processing system.

Simple, fast administration is possible if the total supply of user-specific and machine-specific configurations is administered by means of reference to tool data sets stored in memory. An advantageous feature here is the nonredundant administration of tool data and/or tool list data.

A simple arrangement, good user-friendliness and better error correction can be achieved if a freely definable hierarchical classification, administration and display of the tool data sets are effected. Furthermore, as a result an increase in efficiency in administration and/or an automatic search, for instance for replacement tools for tools that have failed, are possible.

It is advantageous if the administration is effected by means of machine-independent/cross-machine tool lists, in particular by means of masters for preconfiguration. The administration of machine-dependent data, in particular space data, that is, data pertaining to the tool memory and machine-independent data, in particular tool data or in other words data pertaining to the tool, makes for greater variability of the system. It is advantageous for machine-dependent or usage-dependent and machine-independent tool data to be administered separately and as transparently as possible.

It is advantageous if freely definable, expandable tool data are stored in memory. The user is not bound to a fixed tool data set but instead can add data as needed.

Advantageously, various types of data are supported, so that different data types can be processed in one tool data set.

To achieve a certain regulation and limitation of the inputting of values, advantageously for each tool datum, a values range can be defined which is defined in particular by maximal and/or minimal values, and optionally a values range test is activated.

Systematic sequencing and better searching are possible if a classification of the tool data which is expandable is introduced.

For helping and instructing the user, it is advantageous if as a master for producing tools, a tool library is set up in which tool properties are defined and which can be updated upon production of the tool. The updating is advantageously done automatically.

It is advantageous if the tool library has predefined variable definitions whose meaning is adapted to the tool and which can be allocated to a tool group definition and/or to a tool. The tool group library has a list of predefined, expanded tool data definitions, that is, predefined variable definitions with a fixed meaning. Each tool group definition and each tool can be allocated a set of these predefined tool data. The predefined tool data can be polled via an interface by other applications, such as the NC programming system. The user can likewise add to the expanded tool data definitions and supplement the various requirements, such as nomenclature conventions, accordingly.

For easy adaptation to other systems, it is advantageous if variable variable definitions adapted to other applications can be made.

It is possible to administer the entire supply, or an arbitrary number of separately administered subsets, of the total supply of tools and tool data, as well as the usage- and machine-specific configuration.

Freely definable multi-stage classification of the tools and tool data is also possible. By means of the invention, masters for simplified setup and configuration of tools and tool lists are supported.

BRIEF DESCRIPTION OF THE DRAWINGS

The invention will be described below in further detail in terms of exemplary embodiments shown in the drawings. Shown are.

DETAILED DESCRIPTION OF THE PREFERRED EMBODIMENTS

The drawings are merely schematic; that is, in overview, they show symbols for databases, list data sets, pointer variables, download/upload functions, and so forth.

Figure 1:
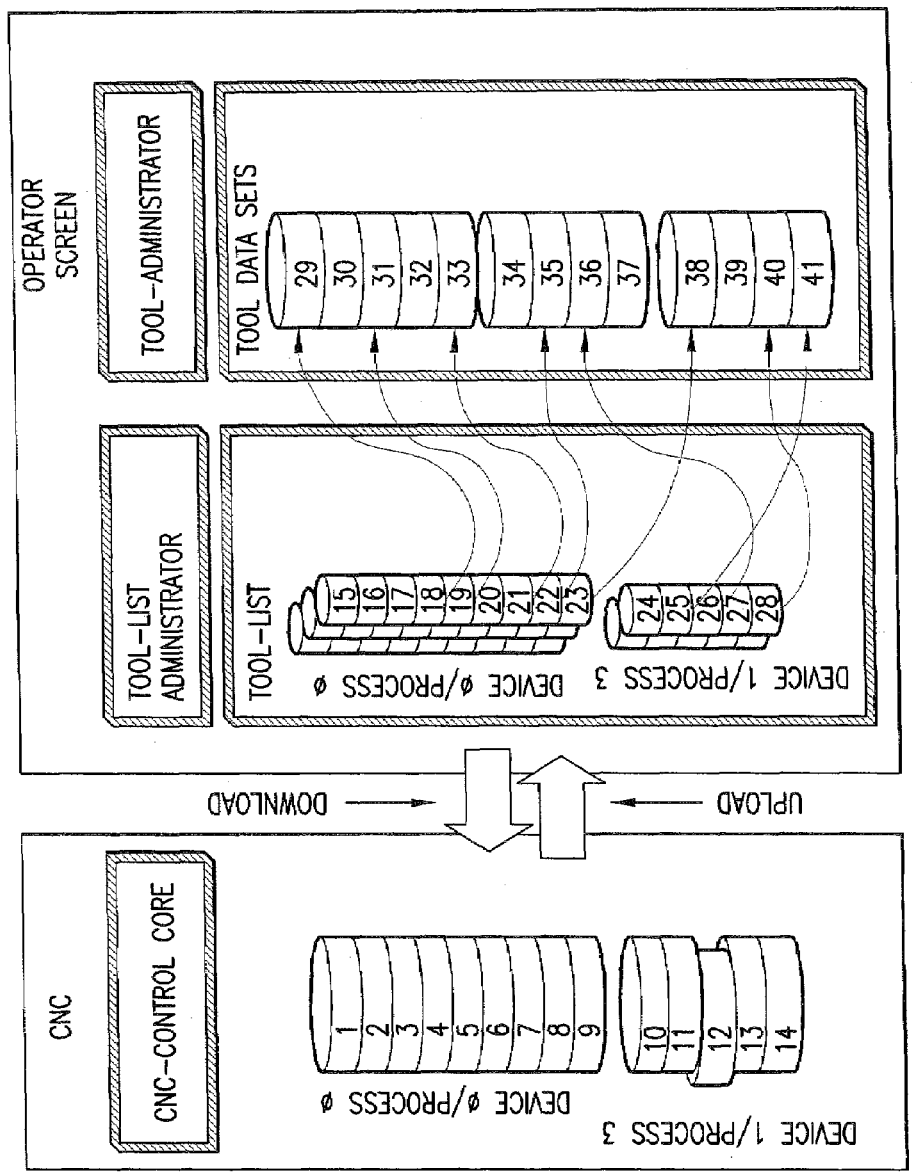
FIG. 1, a schematic overview of an NC control system, which cooperates with an operator screen (for instance on a PC) by the method of the invention.

In FIG. 1, a CNC control system (on the left) is shown schematically with its essential components; this includes the CNC control core, in which the real-time-relevant processes of a machining machine, in particular a machine tool, are executed—for instance in the form of a CNC program. This is done in the manner of set execution in the CNC. The NC control system can also be called an NC data processing unit.

FIG. 1 also shows a unit (on the right), shown here as an operator screen, which can for instance be realized in an ADP system, such as a PC.

FIG. 1 is meant to illustrate the principle of the fundamental data organization employed. The entire CNC or operator screen simulates the processes and tools 1 through 97 used in a machine tool and is configured in accordance with the machining processes of such a machine tool.

The middle block, captioned "Tool list administrator", shows three list data sets, which are associated with the device 0/process 0 of a machine system (such as a milling machining center 1) and two list data sets which are associated with the device 1/process 3 (for instance, milling machine 2). The list data sets procure their properties (number and type of space data sets) from the respective special machine configuration. The three list data sets of process 0 all have the same construction (one spindle, one gripper, seven machine spaces), but different space information for machining different workpieces. Accordingly, each list data set comprises a total of nine space data sets. Each of these space data sets contains all the data that define the tool memory space and furthermore, if the tool memory contains a tool, a reference to the associated tool data set in the tool administrator. The block on the left, which symbolically represents the data of the CNC control system, conversely contains all the data (space and tool data) necessary for the NC machining together in a combined tool and space data set. If a tool list is to be loaded (downloaded) into the CNC, then the space data from the tool list administrator and the tool data from the tool administrator are transmitted, combined, to the control system. However, before such download functions, all the data sets contained are first updated in the tool administrator by means of an inherent upload function of the tool data used. Tool data that occur in a plurality of list data sets are thus always current at the instant of transmission to the control system.

Figure 2:
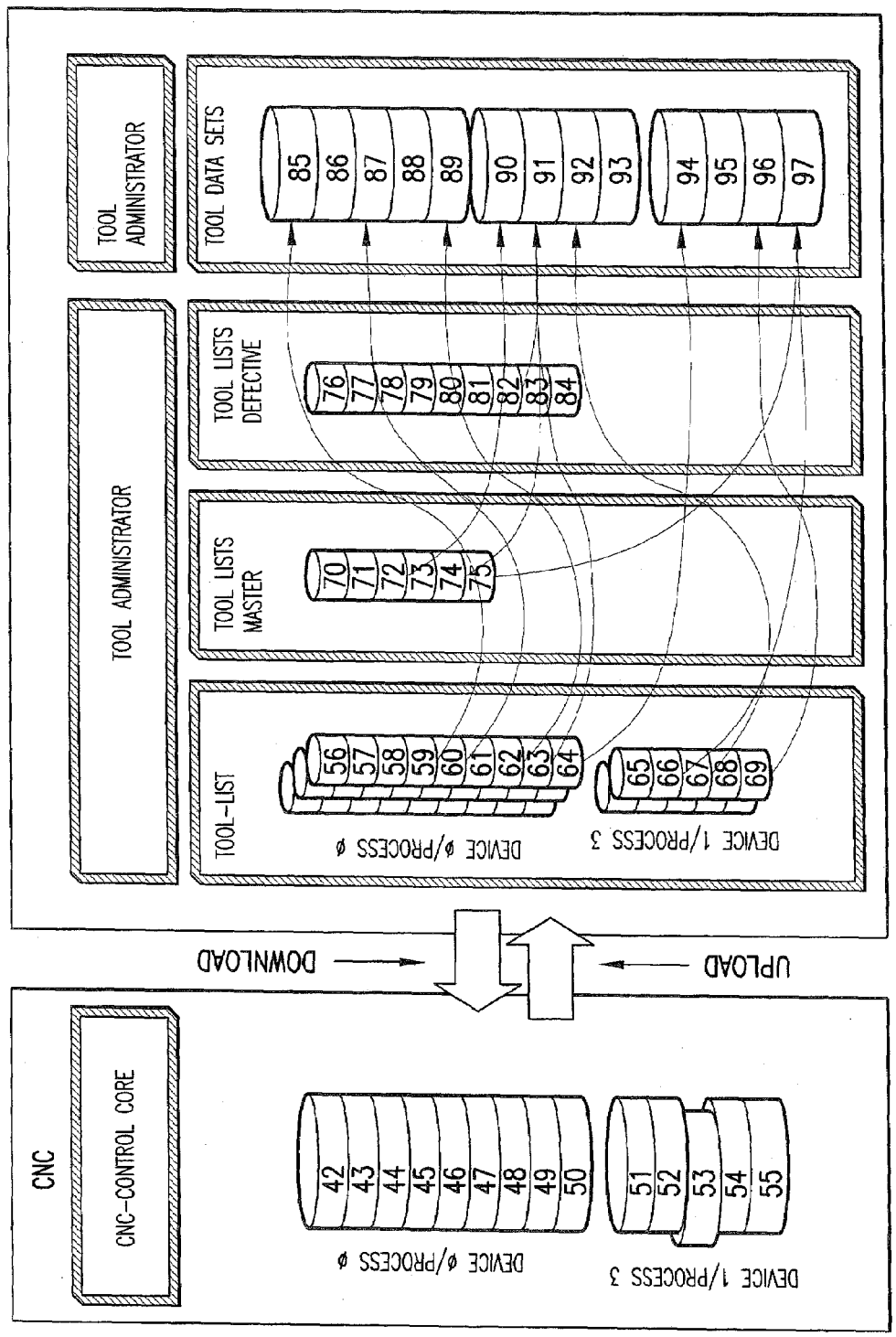
FIG. 2, a likewise schematic overview as in FIG. 1, but with a data structure that is expanded compared to FIG. 1.

FIG. 2 shows that it is additionally possible to set up process-independent list data sets in the production preparation.

FIG. 2 is also meant to show clearly that lists with references to nonexistent (no longer existent) tools, that is, tools deleted from the tool administrator, are delivered to a separate list administrator. By means of prepared correction algorithms, these lists can easily be converted back into usable tool lists again.

Figure 3:
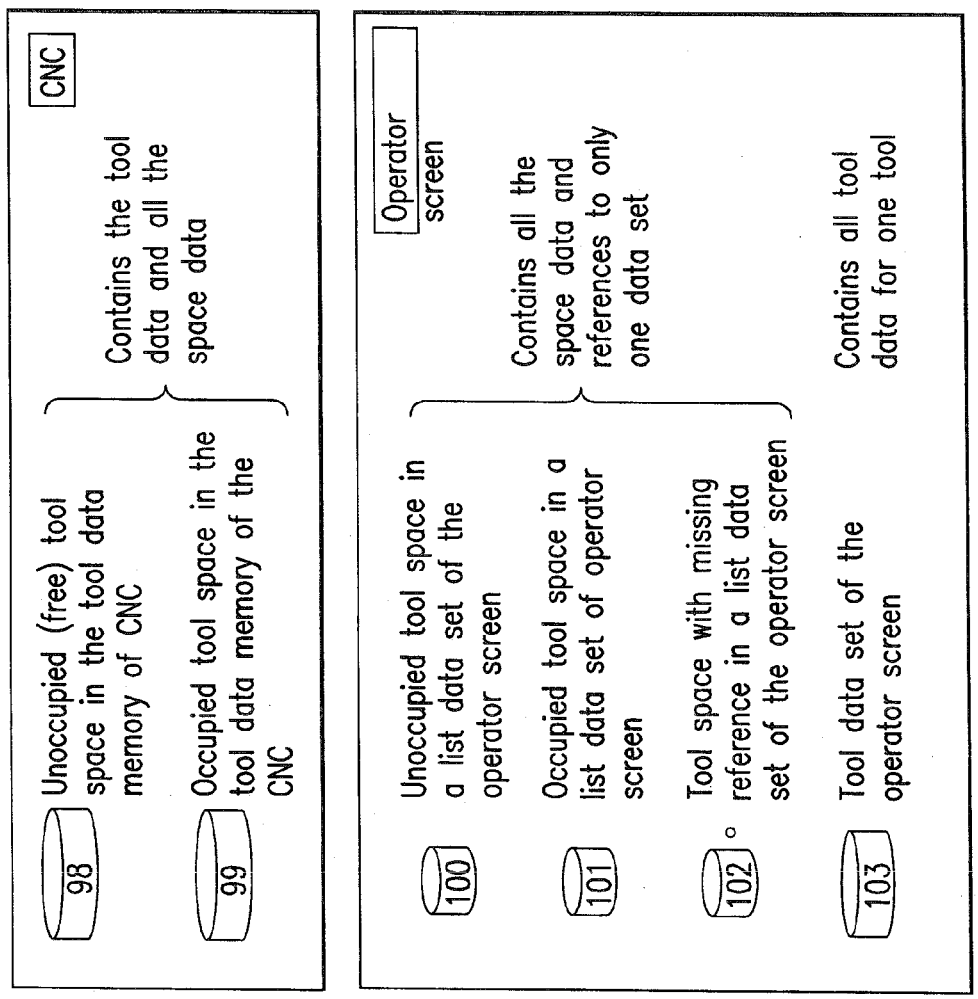
FIG. 3 shows a CNC and an operator screen.

FIG. 3 shows a CNC (Computer Numerical Control) and an operator screen. The CNC comprises a tool data memory 98, 99 that contains the tool data and all of the space data. The tool space can be unoccupied 98 or occupied 99. The operator screen shows all of the space data and references to one data set. Reference numeral 100 indicates unoccupied tool space in a list data set of the operator screen. Reference numeral 101 indicates occupied tool space in a list data set of the operator screen. Reference numeral 102 indicates tool space with a missing reference in a list data set of the operator screen, and reference numeral 103 shows the tool data set of the operator screen that controls all tool data for one tool.

The invention claimed is:

1. A method for the preparation, editing and maintenance of tool data sets for machine-tool processes while operating a machine tool in a Numerical Control (NC) control system, having at least one tool data organization that is separate with respect to a control and is stored in the memory of an Automatic Data Processing (ADP) system, wherein the at least one tool data organization has tool data sets for tools that for each tool to be used each has space for static and dynamic data that are subjected to changes in a Numerical Control (NC) machining process, and wherein the at least one tool data organization has separate list data sets of a machining process that each contain a reference to an associated tool data set, and required list data sets are taken over and stored in memory, together with the associated tool data sets, for process execution in a Numerical Control (NC) data processing unit, and wherein at least the dynamic data of the tool data sets are updated in accordance with a current Numerical Control (NC) machining processes, wherein in an external application or from the control system, without involvement of a tool administrator, a tool data set can be set up from existing tools in accordance with fundamental machining processes and then imported into the tool administrator, and wherein lists with references to tools that are not present or are no longer present, that is, tools that have been deleted from the tool administrator, are delivered to a separate list administrator.

2. The method of claim 1, wherein static data of the tool data sets can also be updated in accordance with the current NC machining processes.

3. The method of claim 1, wherein an automatic detection of defective or inconsistent tool lists is effected.

4. The method of claim 1, wherein an automatic repair of defective or inconsistent tool lists is effected.

5. The method of claim 1, wherein an automatic tool detection of newly generated tools defined in a Computer Numerical Control (CNC) control system is effected.

6. The method of claim 1, wherein a tool administrator detects the newly set-up tools and groups them and administers them in accordance with their properties.

7. The method of claim 1, wherein a complete grouping into categories is effected when a match with a predetermined data set structure and a complete tool specification is provided.

8. The method of claim 1, wherein in the event of incomplete or defective tool data sets, a grouping as an incomplete data set is effected.

9. The method of claim 1, wherein space data from a tool list administrator and tool data from the tool administrator are downloaded, combined, into the control system.

10. The method of claim 1, wherein masters with user data, that is, specific tool data, are set up for setting up and configuring tools and tool lists.

11. The method of claim 1, wherein a plurality of NC control systems and a local/decentralized tool data organization are employed.

12. The method of claim 1, wherein subsets of the total supply of tools and/or tool data are administered separately.

13. The method of claim 1, wherein a separate administration of user-specific data in the form of space data, and tool-dependent tool data is effected.

14. The method of claim 1, wherein a total supply of tools and/or tool data of one or more machines can be administered by means of one computer.

15. The method of claim 1, wherein a plurality of tool data organizations and a higher-ranking management system are administered centrally in a further data processing system.

16. The method of claim 1, wherein administration of a total supply of user-specific and machine-specific configurations is effected by means of reference to tool data sets stored in memory.

17. The method of claim 1, wherein a freely definable hierarchical classification, administration and display of the tool data sets is effected.

18. The method of claim 1, wherein the administration is effected by means of machine-independent/cross-machine tool lists by means of masters for preconfiguration.

19. The method of claim 1, wherein freely definable, expandable tool data are stored in memory.

20. The method of claim 1, wherein different data types can be processed in one tool data set.

21. The method of claim 1, wherein for each tool datum, a values range can be defined which is defined by maximal and/or minimal values, and optionally a values range test can be activated.

22. The method of claim 1, wherein a classification of the tool data which is expandable is introduced.

23. The method of claim 1, wherein as a master for producing tools, a tool library is set up in which tool properties are defined and which can be updated upon production of the tool.

24. The method of claim 23, wherein the tool library has predefined variable definitions whose meaning is adapted to the tool and which can be allocated to a tool group definition and/or to a tool.

25. The method of claim 1, wherein variable definitions adapted to other applications can be made.

26. An apparatus, essentially comprising an NC control system and an ADP system for performing the method of claim 1.

27. A method for the preparation, editing and maintenance of tool data sets for machine-tool processes while operating a machine tool in a Numerical Control (NC) control system, having at least one tool data organization that is separate with respect to a control and is stored in the memory of an Automatic Data Processing (ADP) system, wherein the at least one tool data organization has tool data sets for tools that for each tool to be used each has space for static and dynamic data that are subjected to changes in a Numerical Control (NC) machining process, and wherein the at least one tool data organization has separate list data sets of a machining process that each contain a reference to an associated tool data set and required list data sets are taken over and stored in memory, together with the associated tool data sets, for process execution in a Numerical Control (NC) data processing unit, and wherein at least the dynamic data of the tool data sets are updated in accordance with a current Numerical Control (NC) machining processes wherein in an external application or from the control system, without involvement of a tool administrator, a tool data set can be set up from existing tools in accordance with fundamental machining processes and then imported into the tool administrator, and wherein before downloading, at least some of the data sets are updated in advance in the tool administrator by means of an inherent upload function of the tool data used.

* * * * *